United States Patent
Godinez et al.

(10) Patent No.: US 11,210,360 B2
(45) Date of Patent: Dec. 28, 2021

(54) EDGE-CACHING OPTIMIZATION OF PERSONALIZED WEBPAGES

(71) Applicant: BBY SOLUTIONS, INC., Richfield, MN (US)

(72) Inventors: Sean Godinez, Woodbury, MN (US); Praveen Kotla, Apple Valley, MN (US); David Adolphson, Apple Valley, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 0 days.

(21) Appl. No.: 16/588,900

(22) Filed: Sep. 30, 2019

(65) Prior Publication Data
US 2021/0097127 A1 Apr. 1, 2021

(51) Int. Cl.
G06F 16/957 (2019.01)
G06F 16/9535 (2019.01)

(52) U.S. Cl.
CPC ...... *G06F 16/9577* (2019.01); *G06F 16/9535* (2019.01); *G06F 16/9574* (2019.01)

(58) Field of Classification Search
None
See application file for complete search history.

(56) References Cited

U.S. PATENT DOCUMENTS

| | | | |
|---|---|---|---|
| 6,330,592 B1 | 12/2001 | Makuch et al. | |
| 7,188,214 B1 * | 3/2007 | Kasriel | H04L 69/04 711/118 |
| 7,188,216 B1 | 3/2007 | Rajkumar et al. | |
| 7,200,681 B1 | 4/2007 | Lewin et al. | |
| 8,370,874 B1 * | 2/2013 | Chang | H04N 21/2541 725/46 |
| 10,623,408 B1 * | 4/2020 | Marshall | H04L 63/10 |
| 10,867,005 B1 * | 12/2020 | Villiers | H04L 47/70 |
| 2002/0065899 A1 | 5/2002 | Smith et al. | |
| 2002/0188694 A1 | 12/2002 | Yu | |
| 2007/0180099 A1 | 8/2007 | Tsimelzon et al. | |
| 2009/0150518 A1 * | 6/2009 | Lewin | H04L 67/2842 709/219 |

(Continued)

OTHER PUBLICATIONS

U.S. Appl. No. 16/588,853, filed Sep. 30, 2019, Dynamic Generation and Injection of Edge-Cached Meta-Data.

(Continued)

*Primary Examiner* — Howard Cortes
(74) *Attorney, Agent, or Firm* — Schwegman Lundberg & Woessner, P.A.

(57) ABSTRACT

Systems and techniques for edge-cache optimization of personalized webpages are described herein. A request may be received for a web page from a content delivery network. Requests may be received for user fragments, page layout fragments, personalization decisions fragments, and page content fragments. Directives may be generated in response to the requests including user fragment directives, page layout fragment directives, user data storage directives, a set of fixed section directives, and a set of personalized section directives. The generated directives may be used to construct content fragment caching directives for the page fragments. The content fragment caching directives are transmitted to the content delivery network to provide cashing instructions for the page fragments.

23 Claims, 5 Drawing Sheets

(56) References Cited

U.S. PATENT DOCUMENTS

| | | |
|---|---|---|
| 2010/0274819 A1 | 10/2010 | Lewin et al. |
| 2012/0303697 A1* | 11/2012 | Alstad ................. G06F 16/9574 709/203 |
| 2013/0332814 A1 | 12/2013 | Marlow |
| 2014/0181186 A1 | 6/2014 | Stevens et al. |
| 2015/0180733 A1* | 6/2015 | Krutzler .............. H04L 67/2847 709/219 |
| 2015/0180992 A1* | 6/2015 | Thibeault ................ H04L 67/24 709/201 |
| 2015/0207897 A1* | 7/2015 | Flack ...................... G06F 16/00 709/213 |
| 2015/0310126 A1 | 10/2015 | Steiner et al. |
| 2015/0381756 A1* | 12/2015 | Lotfallah ................ H04L 67/18 709/213 |
| 2018/0205782 A1 | 7/2018 | Wei et al. |
| 2019/0028560 A1 | 1/2019 | Holland |
| 2019/0222619 A1 | 7/2019 | Shribman et al. |
| 2020/0151387 A1 | 5/2020 | Choi et al. |
| 2020/0177941 A1* | 6/2020 | El Essaili .......... H04N 21/4728 |
| 2021/0097115 A1 | 4/2021 | Godinez et al. |

OTHER PUBLICATIONS

"U.S. Appl. No. 16/588,853, Non-Final Office Action dated Jul. 9, 21", 9 pgs.

* cited by examiner

EDGE-CACHING OPTIMIZATION OF PERSONALIZED WEBPAGES

TECHNICAL FIELD

Embodiments described herein generally relate to caching webpages at an edge server and, in some embodiments, more specifically to edge-cache optimization of personalized webpages in a content delivery network.

BACKGROUND

It may be beneficial to serve web pages to users as fast as possible. Having an entire web page (or a large percentage of the web page) served directly to the user from a content delivery network (CDN) may decrease the time it takes to deliver a web page to the user. Additionally, serving directly from the CDN may be less costly, because less traffic traverses the internet to reach backend application servers. While existing approaches may enable serving web site traffic from a CDN, however, these approaches fail to provide efficient caching of dynamically chosen (selected) content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Traditionally, web page personalization greatly reduces the ability to serve the page (or personalized fragments of the page) from a cache of a content delivery network (CDN). The systems and techniques discussed herein enable personalization without reducing the CDN cache efficiency of a web page (or fragments of a web page).

Conventional edge caching solutions may provide a capability of rendering web pages with a mix of fixed or static content and personalized content. However, conventional solutions do not separate the execution of a personalization decision (or decisions) from the rendering of the content chosen by personalization system execution. This limitation prevents the content chosen by the personalization system from being efficiently cached at the CDN. In contrast, the systems and techniques discussed herein provide caching of rendered content at the CDN without respect to how the content was chosen for placement on the page (e.g., fixed or personalized).

Conventional edge caching solutions do not separate the concerns of retrieval of user information to use for a personalization decision from the personalization decision action (or actions) itself. The systems and techniques discussed herein allow personalization decisions to be made quickly without additional data retrieval because user data used for decisions is retrieved once from the underlying domain services, cached at the CDN, and sent from the CDN cache to the personalization system as needed. While the actual personalization decisions may be cached, the cacheability of the content itself is not impacted even if the personalized decisions are not cached (or cached under a complex cache key).

The systems and techniques discussed herein may work with any CDN that supports the world wide web consortium (W3C) edge-side include (ESI) standards specification and may leverage and build upon other CDN caching optimizations (e.g., other forms of includes, post-processing, etc.).

The systems and techniques discussed herein interact with downstream systems that render fragments of a web page (e.g., a subset of a page, etc.) or perform other tasks for building a complete web page and interact with an upstream CDN provider that supports ESI directives.

A number of operations are performed in order to deliver a highly personalized web page experience to a web browser of a user in a way that maximally leverages caching at the CDN tier. Included in the operations is interaction with a personalization decision engine. The interaction is defined as a request for a decision from the personalization decision engine. The interaction may use inputs called decision IDs and a set of decision variables. The response from the request contains a list of actions which represent one or more operations to be performed.

Customer and visitor information are retrieved from domain services and ESI directives are created to cache the information at the CDN. The information will be used as decision variables by the personalization decision engine. The configuration of the web page is translated into ESI directives to optimize CDN caching of the page layout, attributes, personalization decisions, etc. The personalization decisions and decision variables needed for the page are aggregated into a single request to the personalization decisions engine. Actions from the personalization decision engine response are translated into ESI directives to optimize CDN caching of the web page content represented by these actions.

Figure 1:
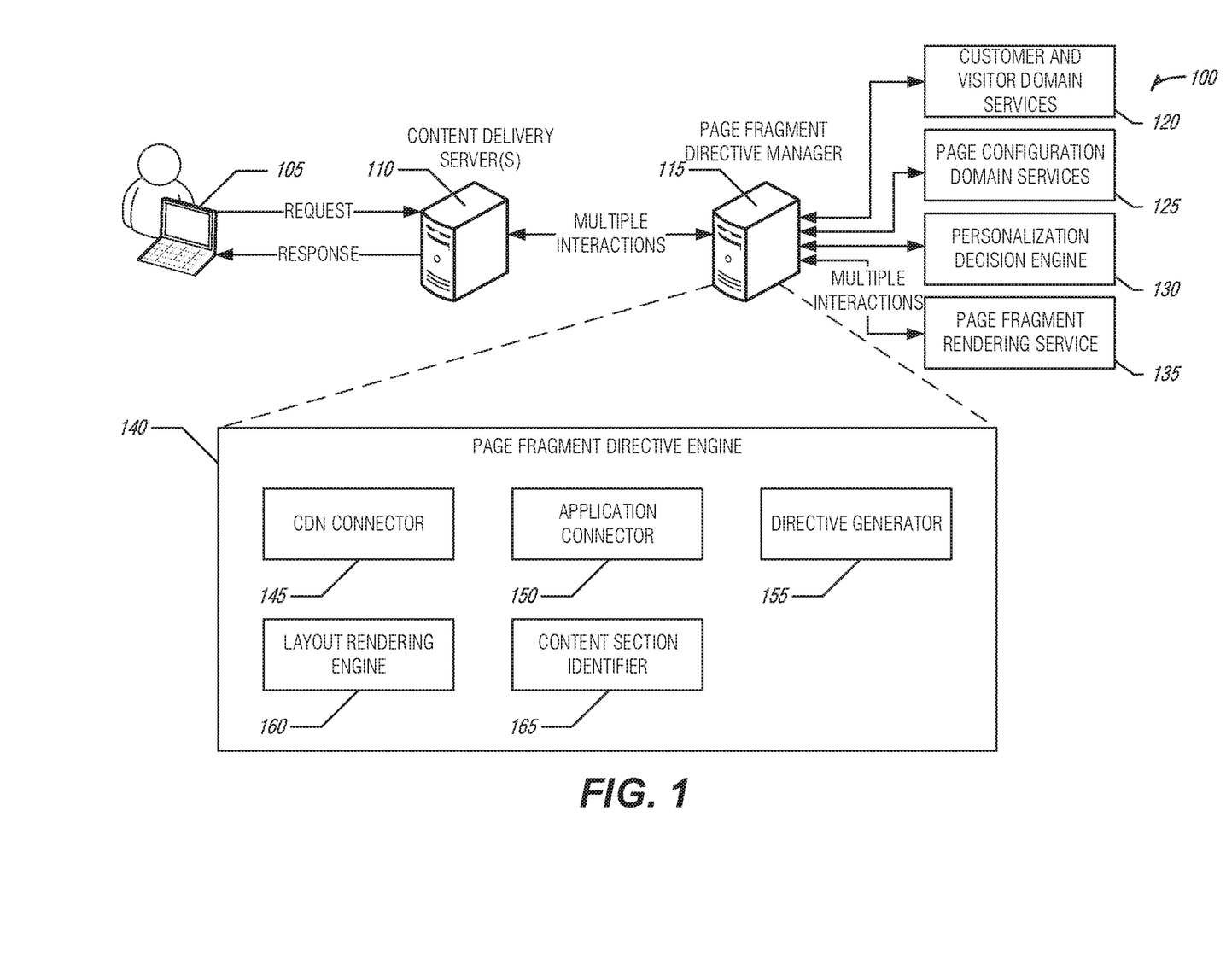
FIG. 1 is a block diagram of an example of an environment and a system for edge-cache optimization of personalized webpages, according to an embodiment.

FIG. 1 is a block diagram of an example of an environment 100 and a system 140 for edge-cache optimization of personalized webpages, according to an embodiment. The environment 100 may include a user computing device 105 that transmits a request for a web page to content delivery server(s) 110. The content delivery server(s) 110 may be communicatively coupled (e.g., via wired network, wireless network, the internet, cellular network, etc.) to a page fragment directive manager 115. The page fragment directive manager 115 may be communicatively coupled to a variety of application servers that provide customer and visitor domain services 120, page configuration domain services 125, a personalization decision engine 130, and a page fragment rendering service 135.

The page fragment directive manager 115 may include a system 140. In an example, the system 140 may be a page fragment directive engine. The page fragment directive manager 115 may be a computing device (e.g., a stand-alone computer, a server, a virtual server, a cloud computing platform, etc.). In an example, page fragment directive manager 115 may be implemented in software stored in computer-readable memory and executed by a computing device, a field programmable gate array (FPGA), an application-specific integrated circuit (ASIC), etc. The system 140 may include a variety of components including a CDN connector 145, an application connector 150, a directive generator 155, a layout rendering engine 160, and a content section identifier 165.

The CDN connector 145 may provide connectivity between the CDN server(s) 110 and the page fragment directive manager 115. A request for a web page may be received as the result of a user requesting a web page from the CDN server(s) 110. For example, a user may use an internet browser to request the page by entering http://www.exampleur.comshopping into an address bar of the web browser using the user computing device 105. The CDN server(s) 110 may receive the request for the page and transmit data included in the request to the CDN connector 145.

The directive generator 155 may generate user fragment directives for a user fragment included in the webpage and page layout fragment directives for a page layout fragment included in the webpage. In an example, the user fragment includes a user ID and the page layout fragment includes a page ID. In an example, the user ID may be one of multiple independent IDs that represent the user (e.g., visitor, customer, etc.). The application connector 150 may provide connectivity between the page fragment directive manager 115 and the application servers. The application connector may generate application programming interface (API) calls that are transmitted to the application servers to retrieve data. In an example, an API call may be generated using the user ID and user information may be retrieved from the customer and visitor domain services 120. In another example, an API call may be generated using the page ID to retrieve page layout data from the page configuration domain services 125.

The CDN connector 145 may receive a request for the user fragment from the CDN server(s) 110. The directive generator 155 may generate user data storage directives for user information retrieved from the customer and visitor domain services 120. In an example, the user information is retrieved by the application connector 150 using the API call generated using the user ID.

The CDN connector 145 may receive a request for a page layout fragment included in the web page. The directive generator 155 may generate a set of fixed section directives for fixed content sections identified by the content section identifier 165 in a render of the layout of the web page generated by the layout rendering engine 160. In an example, the render of the layout of the web page by the layout rendering engine 160 is based on the page layout data retrieved from the page configuration domain services 125 by the application connector 165 using the API generated using the page ID.

The CDN connector 145 may receive a request for a personalization decisions fragment from the CDN server(s) 110. The directive generator 155 may generate a set of personalized section directives for personalized content sections identified based on actions received from the personalization decision engine 130. In an example, the directive generator 155 may generate a set of personalization decisions directives using personalization data retrieved by the application connector 150 from the personalization decision engine 130. The personalization data may include a decision ID (or decision IDs) and decision variables associated with the user information. In an example, in response to receiving the request for the personalization decisions fragment, a set of actions may be retrieved by the application connector 150 from the personalization decision engine 130 based on the decision ID and decision variables corresponding to the personalized decisions fragment. The set of personalized section directives may be generated by the directive generator 155 based on the set of actions.

The CDN connector 145 may receive a request for page content fragments. The directive generator 155 may construct content fragment caching directives for each of the page content fragments using the user fragment directives, the page layout fragment directives, the user data storage directives, the set of fixed section directives, and the set of personalized section directives. In an example, in response to receiving the request for page content fragments, the application connector 150 may retrieve a rendered page fragment for each requested page content fragment from a corresponding page fragment rendering service 135. The content fragment caching directives may be generated by the directive generator 155 based on the rendered page fragments for each requested page content fragment. The CDN connector 145 may transmit the content fragment caching directives to the CDN server(s) 110.

Figure 2:
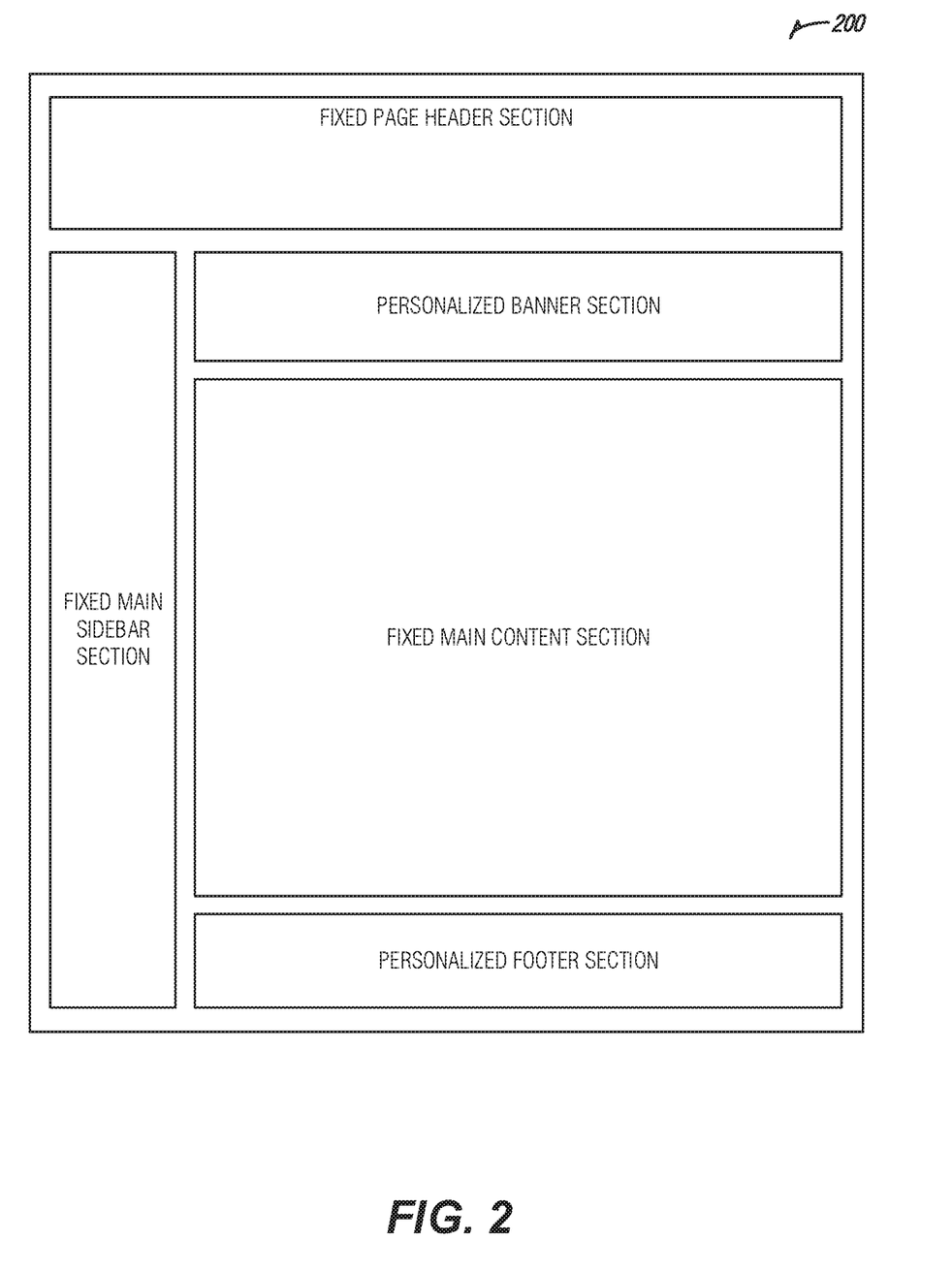
FIG. 2 illustrates a block diagram of an example of a web page for edge-cache optimization of personalized webpages, according to an embodiment.

FIG. 2 illustrates a block diagram of an example of a web page 200 for edge-cache optimization of personalized webpages, according to an embodiment. The web page 200 contains many pieces of content. Some of these content items are fixed in the page while other sections of the page contain content items chosen by the personalization engine. For each section of personalization on the web page 200, the fixed page configuration defines a set of content items from which the personalization engine chooses for each location. Sections may be nested within each other spanning both personalized and fixed sections of content. Furthermore, the same content might appear on different pages. For example, on some pages, a content item "foo" might appear in a fixed section, however on other pages the content item "foo" might appear in a personalized section (e.g., for only some users and not others, etc.).

Figure 3:
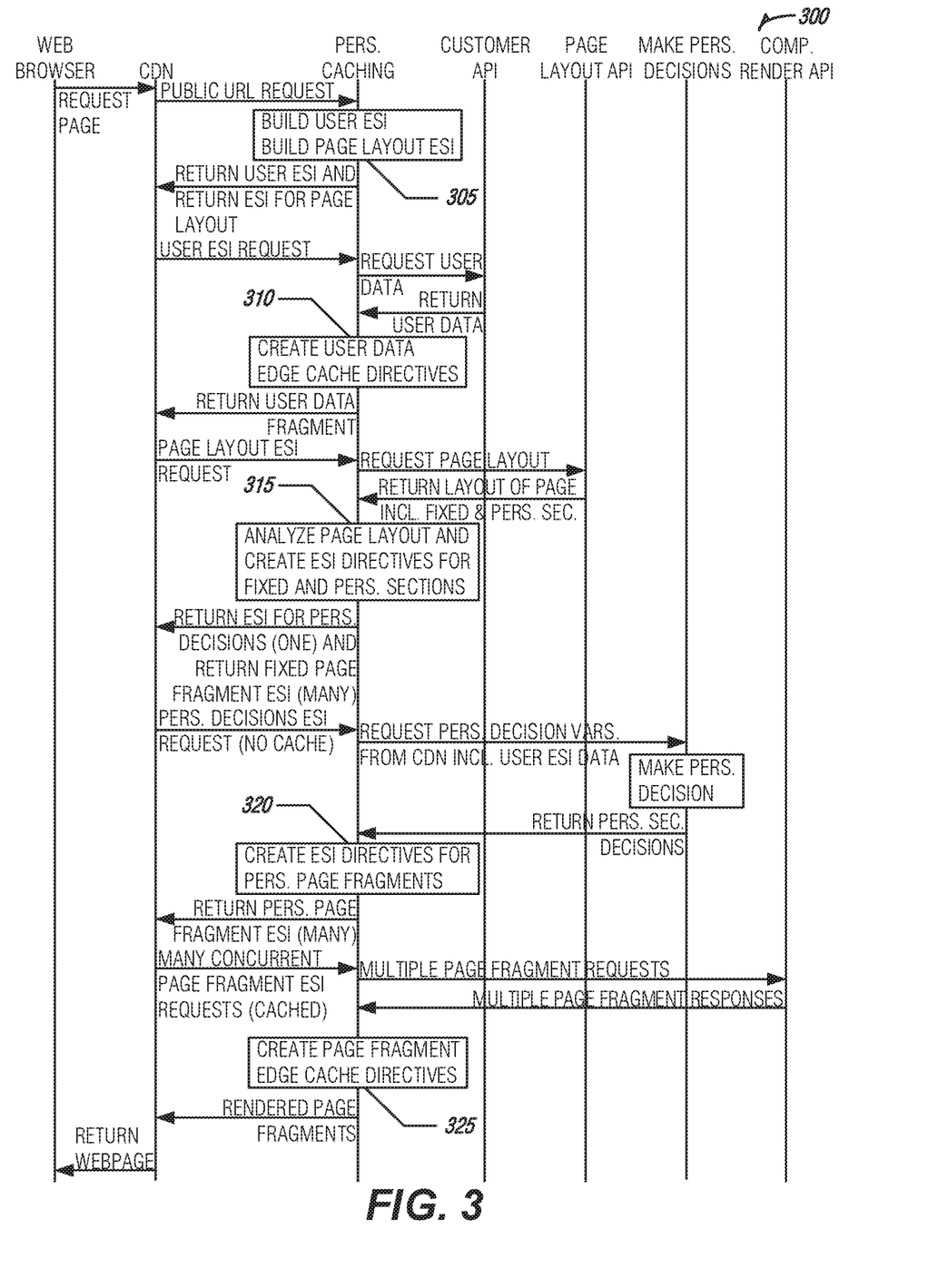
FIG. 3 illustrates a swim lane diagram of an example of a process for edge-cache optimization of personalized webpages, according to an embodiment.

FIG. 3 illustrates a swim lane diagram of an example of a process 300 for edge-cache optimization of personalized webpages, according to an embodiment. The process 300 may provide features as described in FIG. 1.

A public uniform resource locator (URL) request is received for a web page (e.g., at operation 305). Blocking ESI directives are built for a user fragment that contains a user Id as a varying element in the cache key. Blocking ensures the directives execute before the next fragment (e.g., guarantee sequential execution, etc.). In an example, the user fragment may be identical on each page visited by a user so it may only be rendered once during a site visit unless the user data changes. ESI directives are built for a page layout fragment that contains a page Id as a varying element in the cache key.

A request for the user fragment is received from the CDN (e.g., at operation 310). One or more customer application programmer interfaces (APIs) are called using the userId of the request to retrieve user information. ESI directives are created to store the user information in a variety of ESI variables (e.g., lists, maps, etc.).

A page layout fragment request is received from the CDN (e.g., at operation 315). Page layout APIs are called to retrieve page layout data. The page layout data includes information about the placement of content on the page some of which is fixed and some of which needs to be personalized (e.g., a personalization decision is needed in order to determine the content for a location). The layout of the page is rendered (e.g., scaffolding around each content section). Necessary data about personalized sections may be combined into a single ESI directive for the personalization decisions. The data includes a decision ID for each decision as well as necessary decision variables (e.g., data stored in the CDN by the user fragment, from the public URL, etc.) and an ESI directive may be generated for each "fixed" section of the page.

A personalization decisions fragment request is received from the CDN (e.g., at operation 320). The personalization engine is called with the decision IDs and decision variables and retrieves 0 to N actions (e.g., depending on the number of decisions, etc.). Each action returned contains sufficient data to perform a render request of a personalized section of a page. An ESI directive is created for each personalized section of the page. The content chosen by the personalization engine may be rendered as if it has been fixed on the page. There is no difference in the content itself. The difference lies in what made the decision that the content should be placed.

Many concurrent requests for page content fragments may be received (e.g., at operation 325). Some of the fragments were fixed on the page and some were chosen by the personalization engine. It may not be not possible to identify which is which because the requests look identical by design. For each request, the appropriate page component rendering service is called and a rendered page fragment is received in the response. The appropriate CDN caching directives are constructed on the response to the CDN in each fragment. The page is complete and returned from the CDN to the browser (or another device making the request).

Figure 4:
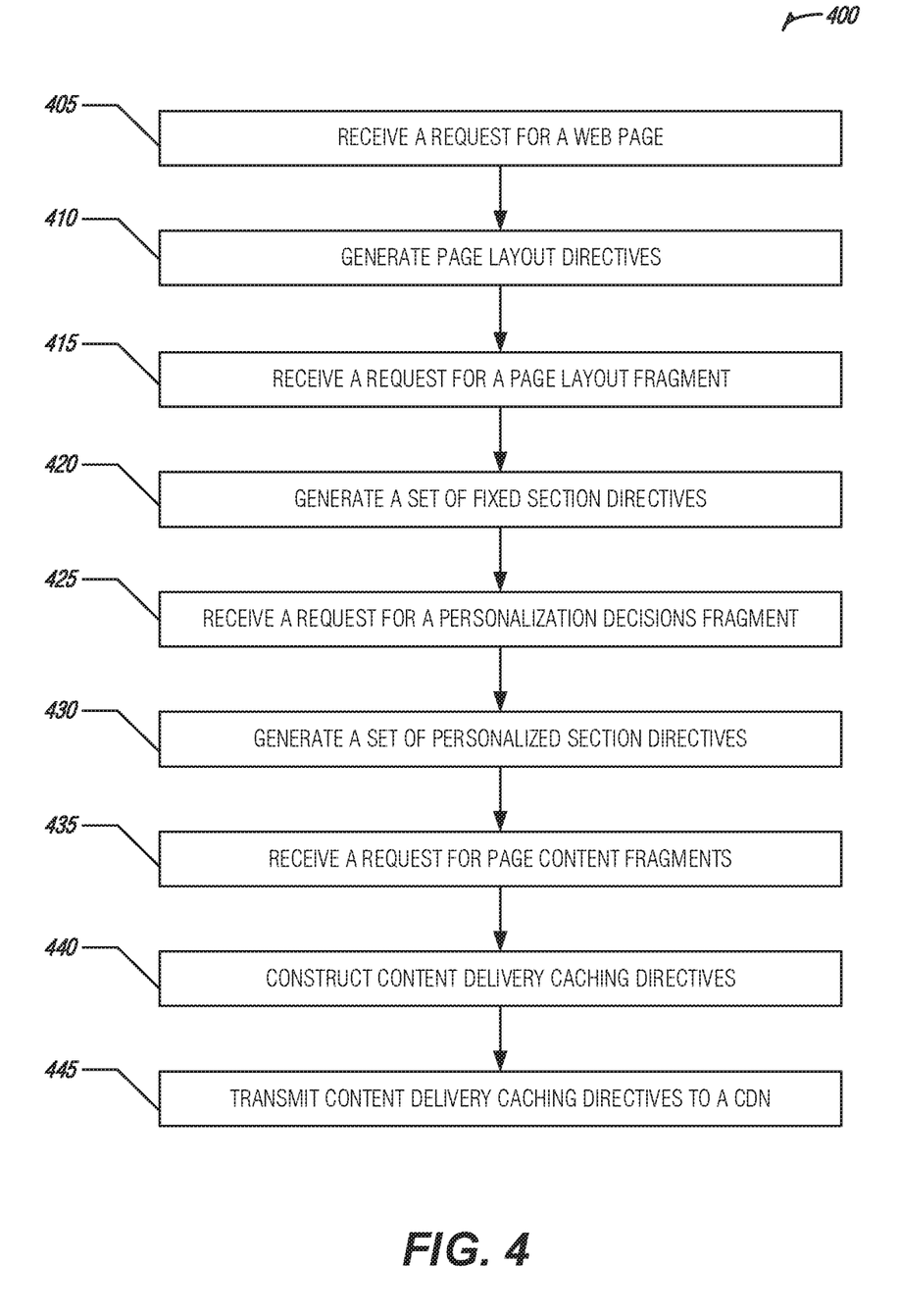
FIG. 4 illustrates an example of a method for edge-cache optimization of personalized webpages, according to an embodiment.

FIG. 4 illustrates an example of a method 400 for edge-cache optimization of personalized webpages, according to an embodiment. The method 400 may provide features as described in FIGS. 1 and 3.

A request may be received (e.g., by the CDN connector 145 as described in FIG. 1, etc.) for a web page from a content delivery network (e.g., at operation 405). Page layout fragment directives may be generated (e.g., by the directive generator 155 as described in FIG. 1, etc.) for a page layout fragment included in the web page (e.g., at operation 410). In an example, and the page layout fragment may include a page ID. In an example, user fragment directives may be generated (e.g., by the directive generator 155 as described in FIG. 1, etc.) for a user fragment included in the web page and. In an example, the user fragment may include a user ID (or multiple IDs that represent the user).

A request may be received (e.g., by the CDN connector 145 as described in FIG. 1, etc.) for the page layout fragment from the content delivery network (e.g., at operation 415). A set of fixed section directives may be generated (e.g., by the directive generator 155 as described in FIG. 1, etc.) for fixed content sections identified (e.g., by the content section identifier 165 as described in FIG. 1, etc.) in a render (e.g., by the layout rendering engine 160 as described in FIG. 1, etc.) of the layout of the web page (e.g., at operation 420). In an example, an application programmer interface (API) call may be generated using the page ID and page layout data may be retrieved from layout data source using the API call. The render of the layout of the web page may be based on the page layout data.

A request may be received (e.g., by the CDN connector 145 as described in FIG. 1, etc.) for a personalization decisions fragment from the content delivery network (e.g., at operation 425). A set of personalized section directives may be generated (e.g., by the directive generator 155 as described in FIG. 1, etc.) for personalized content sections identified based on actions received (e.g., by the application connector 150 as described in FIG. 1, etc.) from a personalization engine (e.g., at operation 430). In an example, a set of personalization decisions directives may be generated using personalization data retrieved from the personalization engine. The personalization data may include a decision ID (or multiple decision IDs) and decision variables associated with the user information. In an example, in response to receipt of the request for the personalization decisions fragment, a set of actions may be retrieved from the personalization engine based on the decision ID and decision variables corresponding to the personalized decisions fragment. The set of personalized section directives may be generated based on the set of actions.

A request may be received (e.g., by the CDN connector 145 as described in FIG. 1, etc.) for page content fragments (e.g., at operation 435). Content fragment caching directives may be constructed (e.g., by the directive generator 155 as described in FIG. 1, etc.) for each of the page content fragments using the page layout fragment directives, the set of fixed section directives, and the set of personalized section directives (e.g., at operation 450). In an example, in response to receipt of the request for page content fragments, a rendered page fragment may be retrieved for each requested page content fragment from a corresponding page component rendering service. The content fragment caching directives may be generated based on the rendered page fragments for each requested page content fragment. The content fragment caching directives may be transmitted (e.g., by the CDN connector 145 as described in FIG. 1, etc.) to the content delivery network (e.g., at operation 455).

In an example, a request may be received (e.g., by the CDN connector 145 as described in FIG. 1, etc.) for the user fragment from the content delivery network. User data storage directives may be generated (e.g., by the directive generator 155 as described in FIG. 1, etc.) for user information retrieved (e.g., by the application connector 150 as described in FIG. 1, etc.) from a user data source. In an example, an application programmer interface (API) call may be generated using the user ID and the user information may be retrieved from the user data source using the API call. In an example, the content fragment caching directives may be constructed using the user fragment directives and the user data storage directives.

Figure 5:
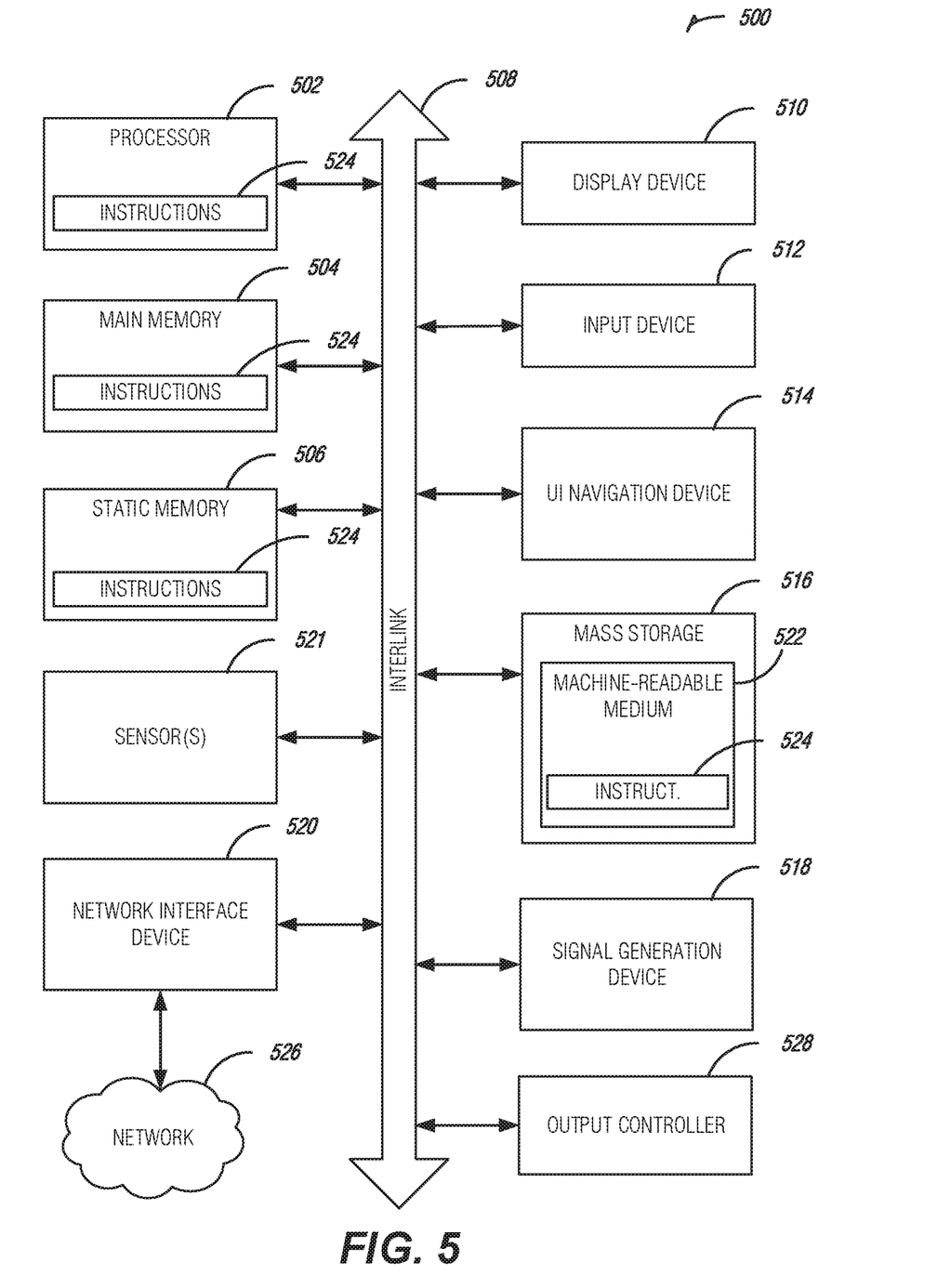
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for optimizing personalized web pages for edge-caching, the system comprising:
   at least one processor; and
   memory including instructions that, when executed by the at least one processor, cause the at least one processor to perform operations to:
      receive a request for a web page from a content delivery network;
      generate page layout fragment directives for a page layout fragment included in the web page;
      receive a request, for the page layout fragment from the content delivery network;
      generate a set of fixed section directives for fixed content sections identified in a render of a layout of the web page;
      receive a request for a personalization decisions fragment from the content delivery network;
      in response to receipt of the request for the personalization decisions fragment, retrieve a set of actions from a personalization engine based on a decision identifier and decision variables that correspond to a personalization decisions fragment;
      generate a set of personalization decisions directives using personalization data retrieved from the personalization engine, wherein the personalization data includes a decision identifier and decision variables associated with user information;
      generate a set of personalized section directives for personalized content sections identified based on actions received from the personalization engine, wherein the set of personalized section directives are generated based on the set of actions;
      receive a request for page content fragments;
      construct content fragment caching directives for each of the page content fragments using the page layout fragment directives, the set of fixed section directives, and the set of personalized section directives; and
      transmit the content fragment caching directives to the content delivery network.

2. The system of claim 1, further comprising instructions that cause the at least one processor to perform operations to:
   generate user fragment directives for a user fragment included in the web page;
   receive a request for the user fragment from the content delivery network; and
   generate user data storage directives for the user information retrieved from a user data source, wherein the content fragment caching directives are constructed in part using the user fragment directives, and the user data storage directives.

3. The system of claim 2, wherein the user fragment includes a user ID.

4. The system of claim 3, further comprising instructions that, cause the at least one processor to perform operations to:
   generate an application programming interface (API) call using the user ID; and
   retrieve the user information from a user data source using the API call.

5. The system of claim 1, wherein the page layout fragment includes a page ID.

6. The system of claim 5, further comprising instructions that cause the at least one processor to perform operations to:
   generate an application programmer interface (API) call using the page ID; and
   retrieve page layout data from layout data source using the API call, wherein the render of the layout of the web page is based on the page layout data.

7. The system of claim 1, further comprising instructions that cause the at least one processor to perform operations to:
   in response to receipt of the request for page content fragments, retrieve a rendered page fragment for each requested page content fragment for a corresponding page component rendering service, wherein the content fragment caching directives are generated based on the rendered page fragments from each requested page content fragment.

8. At least one non-transitory machine-readable medium including instructions for optimizing personalized web pages for edge-caching that, when executed by at least one processor, cause the at least one processor to perform operations to:
- receive a request for a web page from a content delivery network;
- generate page layout fragment directives for a page layout fragment included in the web page;
- receive a request for the page layout fragment, from the content delivery network;
- generate set fixed section directives for fixed content sections identified in a render of the layout of the web page;
- receive a request for a personalization decisions fragment from the content delivery network;
- in response to receipt of the request for the personalization decisions fragment, retrieve a set of actions from a personalization engine based on a decision identifier and decision variables that correspond to the personalization decisions fragment;
- generate a set of personalization decisions directives using personalization data retrieved from the personalization engine, wherein the personalization data includes a decision identifier and decision variables associated with user information;
- generate a set of personalized section directives for personalized content sections identified based on actions received from the personalization engine, wherein the set of personalized section directives are generated based on the set of actions;
- receive a request for page content fragments;
- construct content fragment caching directives for each of the page content fragments using the page layout fragment directives, the set of fixed section directives, and the set of personalized section directives; and
- transmit the content fragment caching directives to the content delivery network.

9. The at least one non-transitory machine-readable medium of claim 8, further comprising instructions that cause the at least one processor to perform operations to:
- generate user fragment directives for a user fragment included in the web page;
- receive a request for the user fragment from the content delivery network; and
- generate user data storage directives for the user information retrieved from a user data source, wherein the content fragment caching directives are constructed in part using the user fragment directives, and the user data storage directives.

10. The at least one non-transitory machine-readable medium of claim 9, wherein the user fragment includes a user ID.

11. The at least one non-transitory machine-readable medium of claim 10, further comprising instructions that cause the at least one processor to perform operations to:
- generate an application programming interface (API) call using the user ID; and
- retrieve the user information from the user data source using the API call.

12. The at least one non-transitory machine-readable medium of claim 8, wherein the page layout fragment includes a page ID.

13. The at least one non-transitory machine-readable medium of claim 12, further comprising instructions that cause the at least one processor to perform operations to:
- generate an application programmer interface (API) call using the page ID; and
- retrieve the user information from a user data source using the API call.

14. The at least one non-transitory machine-readable medium of claim 12, further comprising instructions that cause the at least one processor to perform operations to:
- generate an application programmer interface (API) call using the page ID; and
- retrieve page layout data from layout data source using the API call, wherein the render of the layout of the web page is based on the page layout data.

15. The at least one non-transitory machine-readable medium of claim 8, further comprising instructions that cause the at least, one processor to perform operations to:
- in response to receipt of the request for page content fragments, retrieve a rendered page fragment for each requested page content fragment for a corresponding page component rendering service, wherein the content fragment caching directives are generated based on the rendered page fragments from each requested page content fragment.

16. A method for optimizing personalized web pages for edge-caching, the method comprising:
- receiving a request for a web page from a content delivery network;
- generating page layout fragment directives for a page layout fragment included in the web page;
- receiving a request for the page layout fragment from the content delivery network;
- generating a set of fixed section directives for fixed content sections identified in a render of the layout of the web page;
- receiving a request for a personalization decisions fragment from the content delivery network;
- in response to receipt of the request for the personalization decisions fragment, retrieving a set of actions from a personalization engine based on a decision identifier and decision variables that correspond to the personalization decisions fragment;
- generating a set of personalization decisions directives using personalization data retrieved from the personalization engine, wherein the personalization data includes a decision identifier and decision variables associated with user information;
- generating a set of personalized section directives for personalized content sections identified based on actions received from the personalization engine, wherein the set, of personalized section directives are generated based on the set of actions;
- receiving a request for page content fragments;
- constructing content fragment caching directives for each of the page content fragments using the page layout fragment directives, the set of fixed section directives, and the set of personalized section directives; and
- transmitting the content fragment caching directives to the content delivery network.

17. The method of claim 16, further comprising:
- generating user fragment directives for a user fragment included in the web page;
- receiving a request for the user fragment from the content delivery network; and
- generating user data storage directives for the user information retrieved from a user data source, wherein the content fragment caching directives are constructed in part using the user fragment directives, and the user data storage directives.

18. The method of claim 17, wherein the user fragment includes a user ID.

19. The method of claim 18, further comprising:
generating an application programming interface (API) call using the user ID; and
retrieving the user information from the user data source using the API call.

20. The method of claim 16, wherein the page layout fragment includes a page ID.

21. The method of claim 20, further comprising:
generating an application programmer interface (API) call using the page ID; and
retrieving the user information from a user data source using the API call.

22. The method of claim 20, further comprising:
generating an application programmer interface (API) call using the page ID; and
retrieving page layout data from layout data source using the API call, wherein the render of the layout of the web page is based on the page layout data.

23. The method of claim 16, further comprising:
in response to receiving the request for page content fragments, retrieving a rendered page fragment for each requested page content fragment for a corresponding page component rendering service, wherein the content fragment caching directives are generated based on the rendered page fragments from each requested page content fragment.

* * * * *